(12) United States Patent
Davis

(10) Patent No.: US 9,878,379 B2
(45) Date of Patent: Jan. 30, 2018

(54) CUTTING TOOL WITH ENHANCED CHIP EVACUATION CAPABILITY AND METHOD OF MAKING SAME

(71) Applicant: Kennametal Inc., Latrobe, PA (US)

(72) Inventor: Danny Ray Davis, Asheboro, NC (US)

(73) Assignee: KENNAMETAL INC., Latrobe, PA (US)

( * ) Notice: Subject to any disclaimer, the term of this patent is extended or adjusted under 35 U.S.C. 154(b) by 120 days.

(21) Appl. No.: 14/693,063

(22) Filed: Apr. 22, 2015

(65) Prior Publication Data

US 2016/0311039 A1   Oct. 27, 2016

(51) Int. Cl.
*B23C 5/10* (2006.01)
*B24B 3/02* (2006.01)
*B24B 3/06* (2006.01)

(52) U.S. Cl.
CPC ............... *B23C 5/10* (2013.01); *B24B 3/021* (2013.01); *B24B 3/06* (2013.01); *B23C 2210/0435* (2013.01); *B23C 2210/0457* (2013.01); *B23C 2210/0478* (2013.01); *B23C 2210/241* (2013.01); *B23C 2210/40* (2013.01)

(58) Field of Classification Search
CPC .... B23C 2210/0435; B23C 2210/0457; B23C 2210/0478; B23C 2210/241; B23C 2210/40; B23C 5/10; B24B 3/021; B24B 3/06

See application file for complete search history.

(56) References Cited

U.S. PATENT DOCUMENTS

| 3,003,224 A | 10/1961 | Ribich |
| 4,244,318 A | 1/1981 | Chen |
| 4,895,102 A | 1/1990 | Kachel et al. |
| 5,049,009 A * | 9/1991 | Beck .................... B23C 5/10 407/34 |
| 5,176,476 A | 1/1993 | Duffy et al. |

(Continued)

FOREIGN PATENT DOCUMENTS

| DE | 10015492 A1 | 10/2000 |
| DE | 10016844 B4 | 10/2009 |

(Continued)

OTHER PUBLICATIONS

Jul. 8, 2017 Second Office Action.

(Continued)

*Primary Examiner* — Sara Addisu
(74) *Attorney, Agent, or Firm* — Ian K. Samways

(57) ABSTRACT

A milling cutter includes a shank and a cutting head attached to the shank. The cutting head has a plurality of helical teeth, each tooth including a cutting tip, a leading face and a rear face. A flute is defined between the leading face of a trailing tooth, and a rear face of an immediately preceding tooth. A gully of the flute has a flute base with a portion that is planar or convex in profile to provide additional volume for effective chip evacuation. A method for manufacturing the milling cutter includes rotating a cylindrical blank about its own longitudinal axis, rotating a disc-shaped flute grinding wheel) about a rotational axis of a flute wheel and moving the grinding wheel in a longitudinal direction so as to form the helical flute with the gully having the flute base with the planar or convex portion in profile.

14 Claims, 9 Drawing Sheets

(56) References Cited

U.S. PATENT DOCUMENTS

| | | | |
|---|---|---|---|
| D345,495 S | 3/1994 | Priddy | |
| 6,105,467 A | 8/2000 | Baker | |
| 6,164,876 A | 12/2000 | Cordovano | |
| 6,368,030 B1 * | 4/2002 | Sato | B23C 5/10 407/53 |
| 6,991,409 B2 | 1/2006 | Noland | |
| 7,186,063 B2 * | 3/2007 | Volokh | B23C 5/10 407/53 |
| D621,426 S | 8/2010 | Fusejima et al. | |
| D626,575 S | 11/2010 | Washington, III | |
| 8,091,504 B2 | 1/2012 | Hsieh et al. | |
| D654,935 S | 2/2012 | Kishimura et al. | |
| D655,323 S | 3/2012 | Brockhage | |
| 8,211,234 B2 | 7/2012 | Rosenblatt | |
| D685,825 S | 7/2013 | Hoelbl | |
| D694,298 S | 11/2013 | Hoelbl | |
| 8,578,877 B2 | 11/2013 | Tajima | |
| 8,640,755 B2 | 2/2014 | Canale et al. | |
| 8,671,872 B2 | 3/2014 | Pilipauskas et al. | |
| 8,714,690 B2 | 5/2014 | Davancens et al. | |
| D724,125 S | 3/2015 | Pierce | |
| 8,991,681 B2 | 3/2015 | Maki et al. | |
| D737,875 S | 9/2015 | Santamarina et al. | |
| D774,573 S | 12/2016 | Sharivker et al. | |
| D792,489 S | 7/2017 | Sharivker et al. | |
| D793,460 S | 8/2017 | Sharivker et al. | |
| 9,724,768 B2 | 8/2017 | Sharivker et al. | |
| D796,563 S | 9/2017 | Sharivker et al. | |
| D797,170 S | 9/2017 | Sharivker et al. | |
| 2002/0031409 A1 | 3/2002 | Sato | |
| 2006/0045637 A1 | 3/2006 | Flynn | |
| 2006/0045638 A1 | 3/2006 | Flynn | |
| 2006/0067797 A1 | 3/2006 | Calamia | |
| 2007/0098506 A1 | 5/2007 | Flynn | |
| 2007/0154272 A1 | 7/2007 | Wells et al. | |
| 2007/0160429 A1 | 7/2007 | Volokh | |
| 2008/0219782 A1 * | 9/2008 | Flynn | B23C 5/10 407/42 |
| 2009/0185878 A1 | 7/2009 | Turrini | |
| 2010/0209201 A1 | 8/2010 | Davis | |
| 2010/0215447 A1 | 8/2010 | Davis | |
| 2011/0085862 A1 | 4/2011 | Shaffer | |
| 2011/0217132 A1 | 9/2011 | Wells et al. | |
| 2011/0268513 A1 | 11/2011 | Takagi et al. | |
| 2012/0183363 A1 | 7/2012 | Davis et al. | |
| 2012/0282044 A1 | 11/2012 | Volokh et al. | |

FOREIGN PATENT DOCUMENTS

| | | |
|---|---|---|
| EP | 329624 A2 | 8/1989 |
| GB | 2446036 A | 7/2008 |
| GB | 2495200 | 4/2013 |
| JP | 62188616 | 8/1987 |
| JP | 62188616 A2 | 8/1987 |
| JP | 07237018 A | 9/1995 |
| JP | 8168915 | 7/1996 |
| JP | 2006110683 | 4/2006 |

OTHER PUBLICATIONS

Oct. 13, 2015 First office action.
Mar. 28, 2016 Office action (3 months).
Apr. 26, 2016 Office action (3 months).
May 17, 2016 First office action.
Aug. 18, 2016 Final Office Action.

* cited by examiner

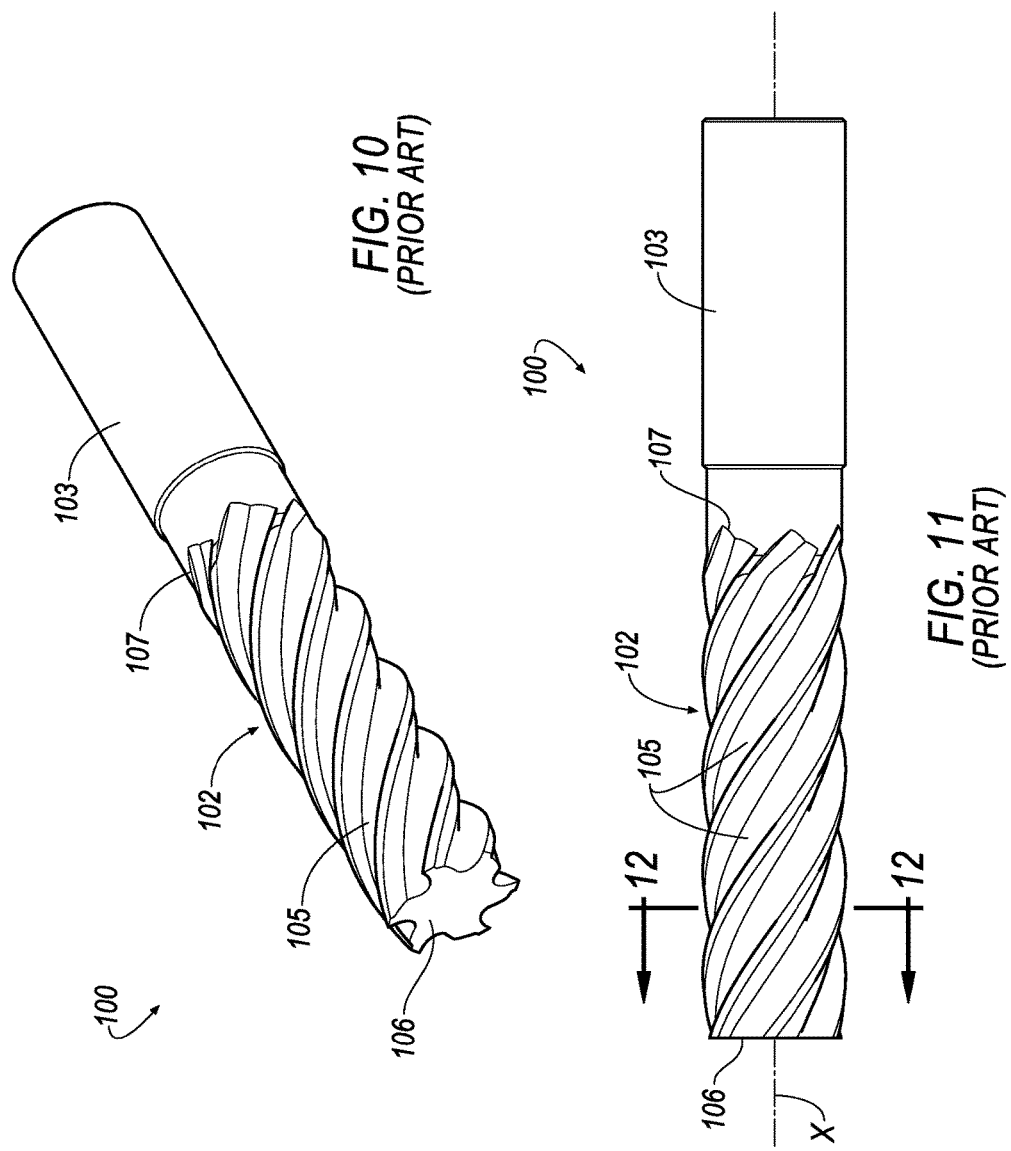

CUTTING TOOL WITH ENHANCED CHIP EVACUATION CAPABILITY AND METHOD OF MAKING SAME

BACKGROUND OF THE INVENTION

Field of the Invention

The invention pertains to the field of cutting tools. More particularly, the invention pertains to a multi-flute cutting tool having a flute that is W-shaped in cross section for superior chip evacuation (i.e., removal of swarf).

Description of Related Art

A conventional milling cutter 100 is illustrated in FIGS. 10-12. The cutter 100 has a cutting head 102 and a coaxial integral shank 103 for securing in a chuck or arbor of a machine tool for rotation about an axis X.

The cutting head 102 has a plurality of helical flutes 105 extending from a leading end 106 of the head 102, to a trailing end 107 of the head 102. Each flute 105 has a tooth 108 provided with a leading face 109 and a rear face 110, as shown in FIG. 12. The leading face 109 faces the direction of rotation of the cutter 100 when in use and has a cutting tip 104.

As shown in FIG. 10, each tooth 108 also has a primary relief rake facet 112 which, in the example illustrated, is planar. The primary facet 112 comprises a land, which extends rearwardly from the tip 104 of the leading edge 109 of the tooth 108 to a heel 115.

The leading face 109 of a trailing tooth 108, and a rear face 110 of the immediately preceding tooth 108 diverge and define, together with a flute base 113, a gully 114. The gully 114 is provided for swarf (i.e., chip) removal purposes and is designed so that in use the swarf generated during cutting is carried away without clogging the cutter. This is achieved by controlling the pitch of the teeth, the depth of the gully 114 and the width of the land of the primary facet 112.

As described above, the geometry of rotating cutters includes many features and elements, each of them playing a role in achieving desired performance goals. The most basic geometry element is a flute, otherwise known as a groove, a plurality of which forming rake edges, rake faces, teeth and eventually serving as a chip (i.e., swarf) formation and evacuation channel. The flute geometry or flute shape makes the difference between success and failure in workpiece milling applications. Conventionally, the rake face, flute core and flute back is formed by a single movement (i.e. grinding path), where cross sectional shape of the flutes are formed as a result of mathematical calculations based on input including the flute core, rake angle, depth of the rake angle measurements, tooth width (or attack angle), grinding wheel shape and flute core profile along the axis of rotation.

The aforementioned input imposes strict bounds for the calculations, resulting in certain flute shapes to be mathematically impossible to achieve. As a result, the majority of flute cross-sectional shapes have very much in common that relies on having as much as flute depth as possible, while maintaining the desired tooth width to provide the desired volume for chip evacuation.

The disadvantage of the common flute shape can be seen in the resultant shape of the rear face 110 of the flute 105, where a bulge of substrate material is left, thereby reducing the volume of the flute 105 without adding much strength. This disadvantage becomes much more distinct when implementing multi-flute milling cutters with six (6) or more flutes. Shortage of available space impose an insolvable task for common flutes to provide enough volume for chip evacuation, while providing sufficient tooth width. As a result, many conventional multi-flute cutters have problems with the adequate evacuation of chips.

SUMMARY OF THE INVENTION

The problem of providing effective chip evacuating in multi-flute cutting tools is solved by providing a multi-flute cutting tool with flutes having a flute base with a portion of the flute base having a substantially planar or convex profile to provide additional volume for effective chip evacuation. The distinct visual difference with conventional milling cutters is in removing the flute back bulge with a grinding wheel having a first grinding portion formed at a first angle and a second grinding portion formed at a second angle with respect to a plane that is perpendicular to the longitudinal axis of the milling cutter.

In one aspect of the invention, a solid mill cutter comprises a shank; a cutting head attached to the shank, the cutting head having a plurality of helical teeth, each tooth including a cutting tip, a leading face and a rear face; and a flute defined between the leading face of a trailing tooth, and a rear face of an immediately preceding tooth, wherein a gully of the flute has a flute base with a portion that is generally planar or convex in profile to provide additional volume for effective chip evacuation.

In another aspect of the invention, a method of manufacturing a milling cutter having a cutting head, a shank and a flute, the method comprising:
 (a) rotating a cylindrical blank about its own longitudinal axis;
 (b) rotating a disc-shaped flute grinding wheel about a rotational axis of a flute wheel, the grinding wheel having a first grinding portion and a second grinding portion;
 (c) moving the grinding wheel in a longitudinal direction into the cylindrical blank at a linear speed while the cylindrical blank is rotating so as to form a helical flute in the wall surface of the cylindrical blank; and
 (d) repeating steps (b) and (c) a number of times equal to a desired number of additional flutes,
 whereby the grinding wheel forms the helical flute with a gully having a flute base with a portion that is planar or convex in profile to provide additional volume for effective chip evacuation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 10 is an isometric view of a conventional milling cutter;

FIG. 11 is a side view of the conventional milling cutter of FIG. 9; and

DETAILED DESCRIPTION OF THE INVENTION

Figure 1:
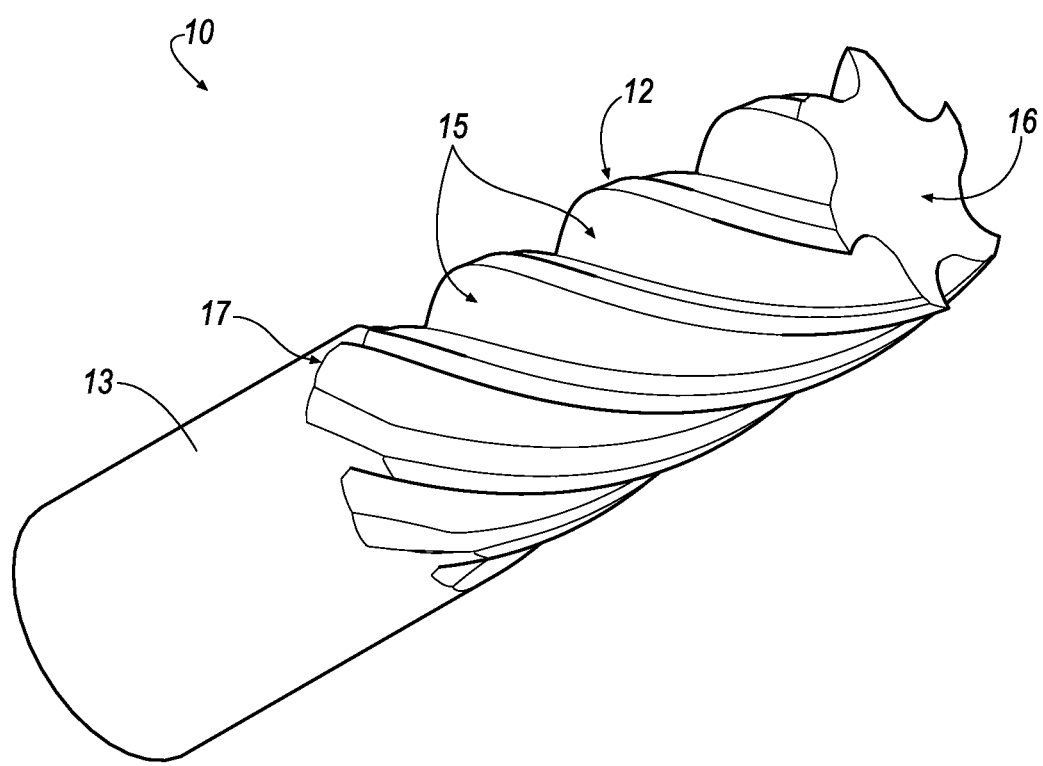
FIG. 1 is an isometric view of a milling cutter with a flute base having a portion that is substantially planar or convex according to an embodiment of the invention.

A cutting tool 10, for example, a milling cutter, is shown in FIGS. 1-6 according to an embodiment of the invention. Although a milling cutter 10 is shown in the illustrated embodiment, the principles of the invention described below can be applied to other rotary cutting tools, such as solid drills, taps, reamers, and the like. The milling cutter 10 has a cutting head 12 and a coaxial integral shank 13 for securing in a chuck or arbor of a machine tool for rotation about an axis, X.

The cutting head 12 has a plurality of helical flutes 15 extending from a leading end 16 of the head 12, to a trailing end 17 of the head 12. In the illustrated embodiment, the cutting head 12 has a total of six (6) flutes 15. However, it will be appreciated that the invention can be practiced with any desirable number of flutes 15, depending on the dimensions of the milling cutter 10. For example, a milling cutter 10 having a relatively large cutting diameter D has the capability of having a greater number of flutes than a milling cutter with a relatively smaller cutting diameter D, and vice versa. Thus, the milling cutter 10 can have as few as six (6) flutes 15 (and teeth 18) to as many as thirty (30) flutes 15 (and teeth 18), and a cutting diameter, D, between about 6 mm and about 35 mm.

Figures 2, 3:
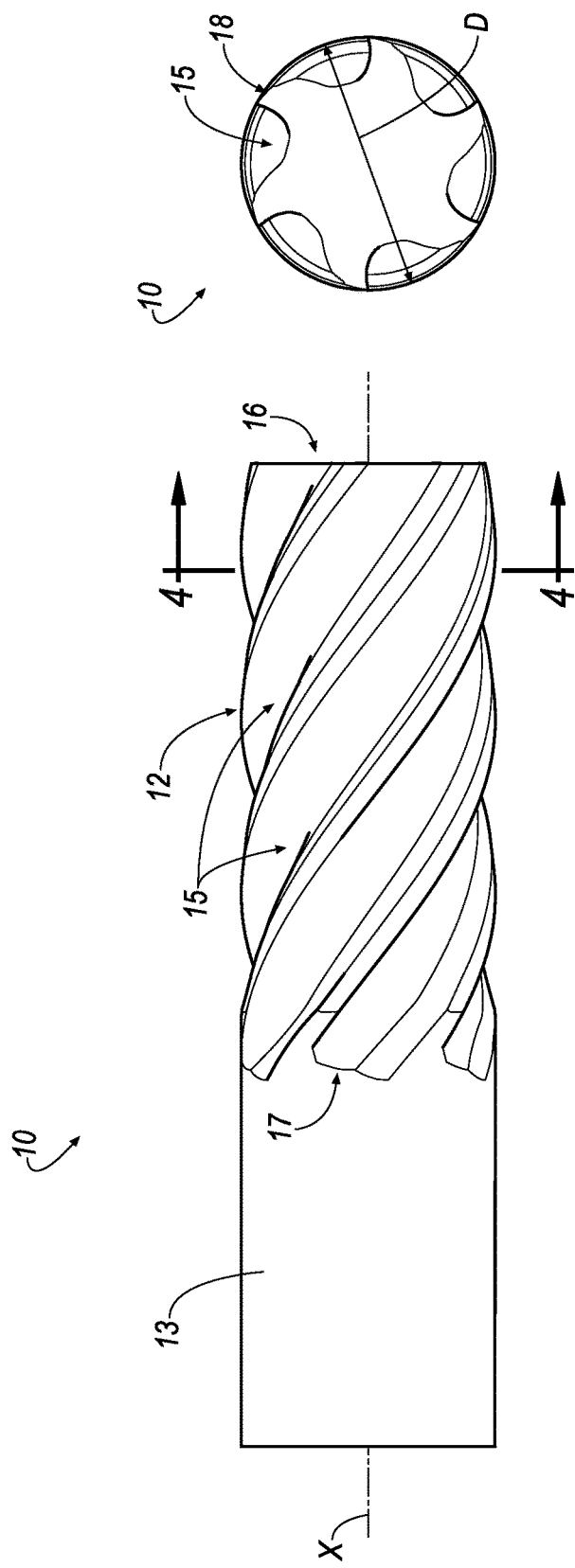
FIG. 2 is a side view of the milling cutter of FIG. 1.
FIG. 3 is an end view of the milling cutter of FIG. 1.
Figure 4:
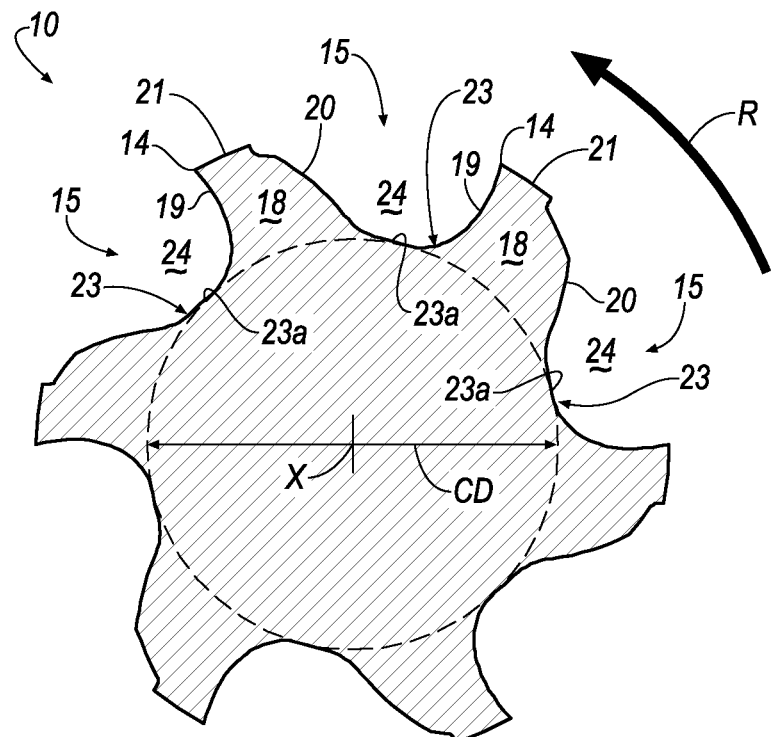
FIG. 4 is a cross-sectional view of the milling cutter taken along line 4-4 of FIG. 2.
Figure 6:
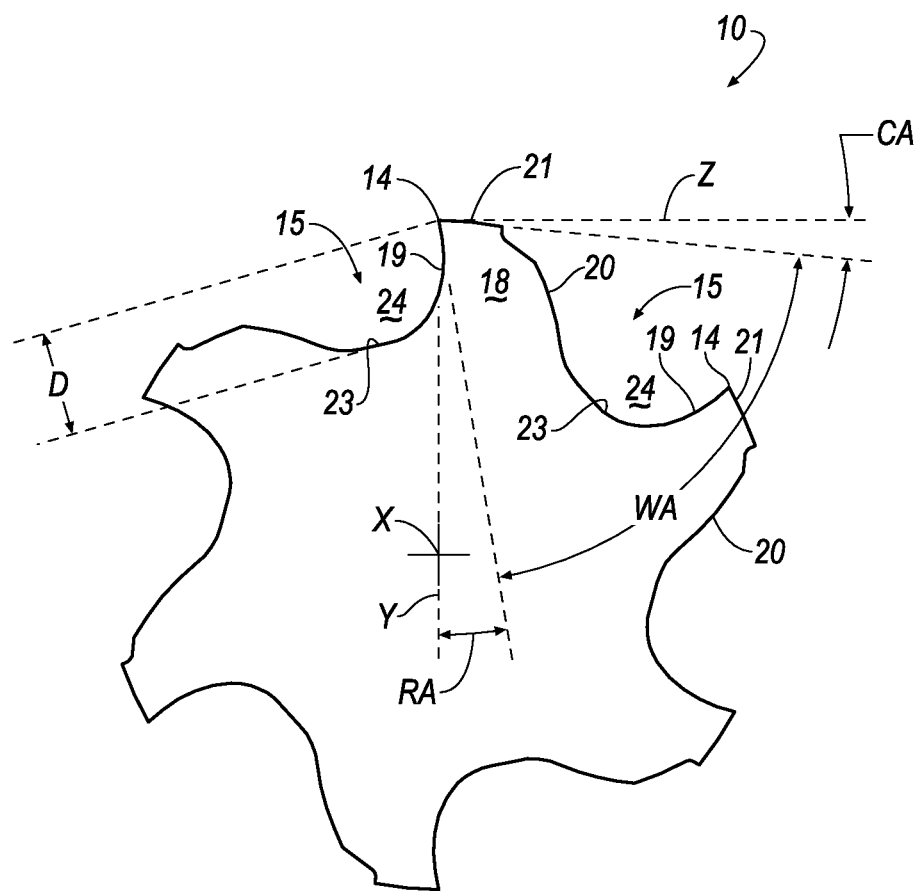
FIG. 6 is another end view of the milling cutter of FIG. 1.

As shown in FIG. 4, each flute 15 has a tooth 18 provided with a leading face 19 and a rear face 20. Each flute 15 is disposed between the leading face 19 of a trailing tooth 18 and the rear face 20 of an immediately preceding tooth 18. The leading face 19 faces the direction of rotation, R, of the cutter 10 when in use and has a cutting tip 14. The cutting tip 14 of each tooth 18 lie on the circumference of a pitch circle having a diameter, D (FIG. 3). The leading face 19 has a positive radial rake angle, RA. The radial rake angle. RA, is the angle that the inclined leading face 19 makes with a radial line Y, as shown in FIG. 6, extending from the tool axis, X, to the tip 14 of a tooth 18. In one embodiment, the radial rake angle, RA, is in a range between about −15 degrees to about +15 degrees, depending on the material being cut, and a zero radial rake angle, RA, may be required for some materials.

As shown in FIG. 6, each tooth 18 also has a primary relief rake facet 21 which, in the example illustrated, is planar. The primary facet 21 comprises a land which extends rearwardly from the tip 14 of the leading edge 19 of the tooth 18. The primary facet 21 is inclined at an angle to a tangent, Z, extending from the pitch circle at the tooth tip 14. This angle is referred to as the primary clearance angle, CA, and is of the order of approximately five (5) degrees to approximately ten (10) degrees. Alternatively, however, the primary facet 21 may not be planar, but can be eccentric or convex, providing more material, and hence greater strength for each tooth 18. The primary clearance angle, CA, is used to define the geometry of the double ratchet tooth form. By controlling the primary clearance angle, CA, the geometry of the tooth 18 can be defined in the manufacturing process. In addition, each tooth 18 defines a wedge angle, WA, which is the angle between the leading face 19 and the primary facet 21. In one embodiment, the wedge angle (WA) is between about 60-90 degrees.

The flute 18 defined by the leading face 19 of a trailing tooth 18, and a rear face 20 of the immediately preceding tooth 18 defines a gully 24 with a flute base 23. The gully 24 has a depth, D, defined as the distance from the cutting tip 14 to the flute base 23. The gully 24 is provided for swarf (i.e. chip) removal purposes and is designed so that in use the swarf generated during cutting is carried away without clogging the cutter 10. This is achieved by controlling the pitch of the teeth, the depth of the gully 24 and the width of the land of the primary facet 21.

Figure 5:
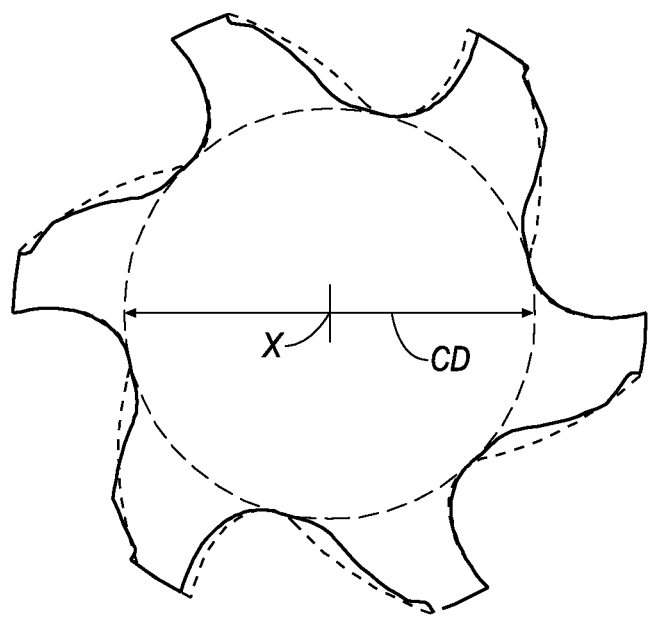
FIG. 5 is another cross-sectional view of a conventional milling cutter and the milling cutter of the invention taken along line 4-4 of FIG. 2.
Figure 12:
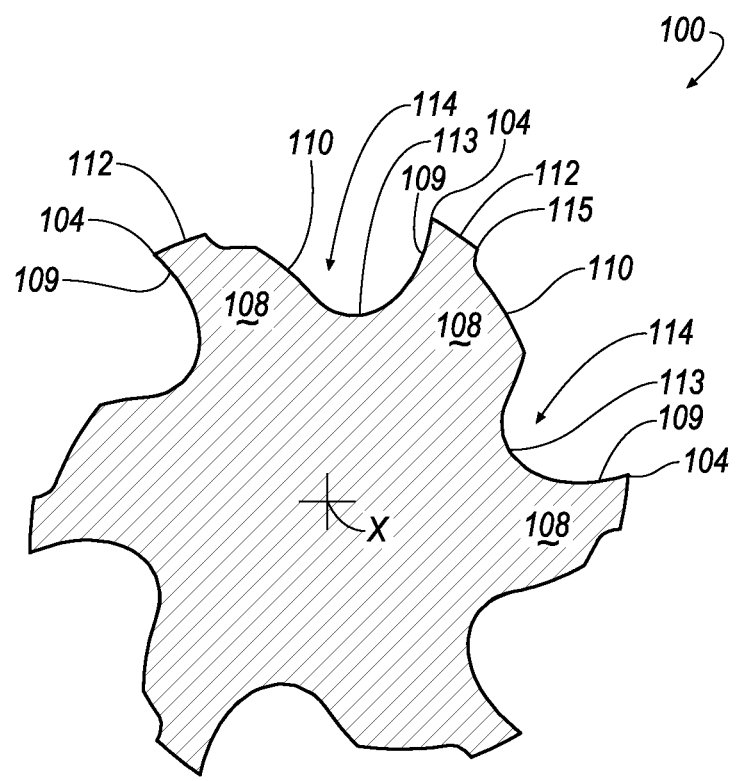
FIG. 12 is a cross-sectional view of the conventional milling cutter taken along line 11-11 of FIG. 10.

One aspect of the invention is that a portion 23a of the flute base 23 of the gully 24 has a generally planar or slightly convex profile, as shown in FIG. 6. FIG. 5 shows a comparison of the profile of the gully 24 of the flute 15 of the invention (solid line) and the profile of the gully 114 of the flute 105 of a conventional milling cutter (dashed lines). It is readily apparent that the profile of the gully 24 of the invention with a portion 23a of the flute base 23 of the gully 24 having a generally planar or slightly convex profile is visually different than the continuously rounded or radiused profile of the gully 114 of the flute 105 of the conventional milling cutter. This distinct visual difference is from removing the bulge 125 in the rear face 110 in the gully 114 of the conventional flute 105 that is shown in FIG. 12. In doing so, the secondary clearance surface 112 in the conventional cutting tool 100 is essentially removed from the milling cutter 10 of the invention, resulting in the gully 24 having additional volume as compared to the conventional gully 114. This additional volume is especially valuable for multi-flute cutting tools, and in particular multi-flute cutting tools having unequal indexing (i.e. unequal spacing between teeth). It has been shown by the inventors that the gully 24 of the flute 15 of the invention provides superior swarf evacuation as compared to the flute 105 of the conventional milling cutter 100, even though the milling cutter 10 of the invention has a substantially identical core diameter, CD, as the conventional milling cutter 100.

Figure 7:
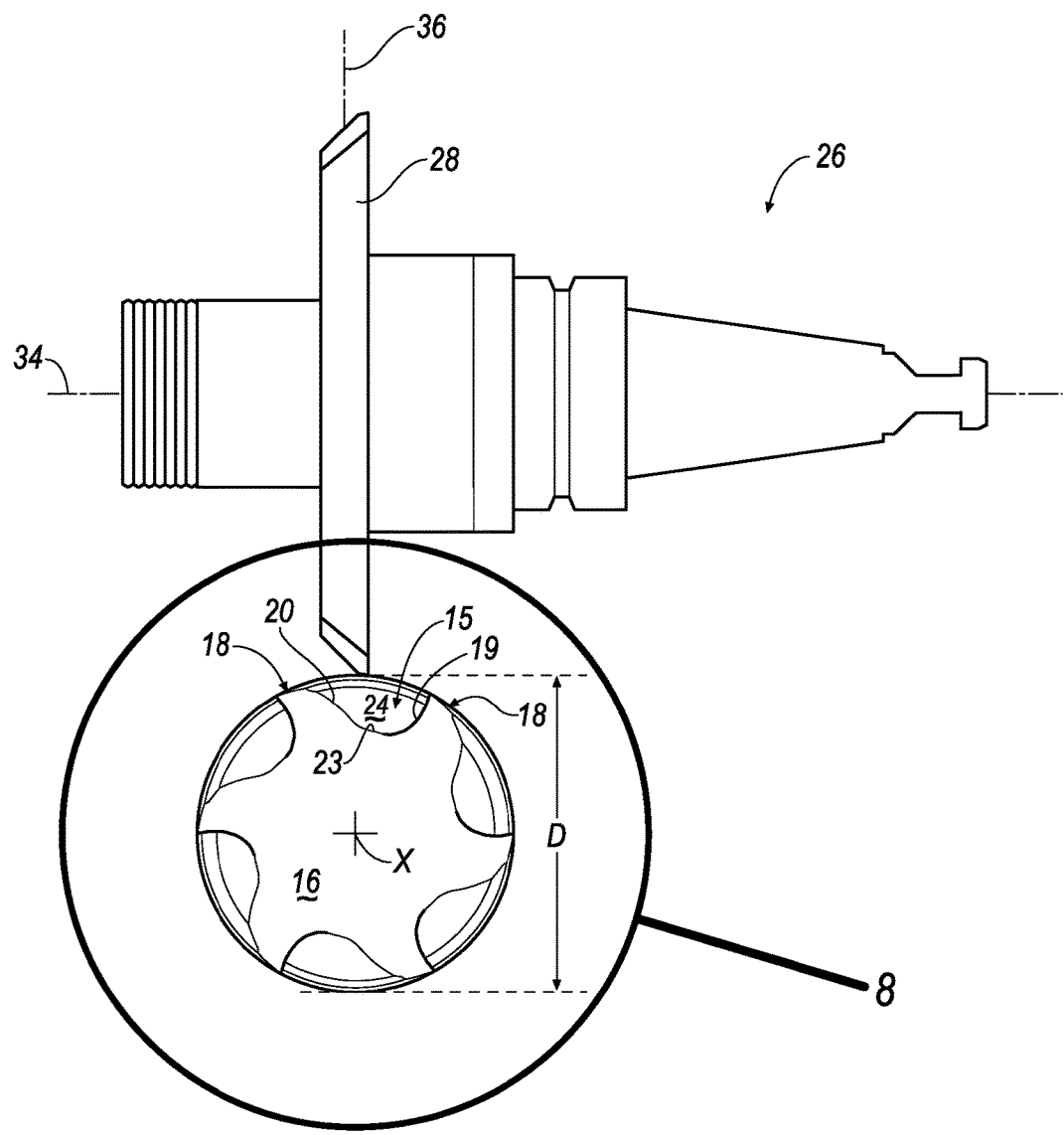
FIG. 7 shows a grinding operation in a single path grinding process for forming the flutes and the flute base with a portion that is substantially planar or convex according to a method of the invention.
Figure 8:
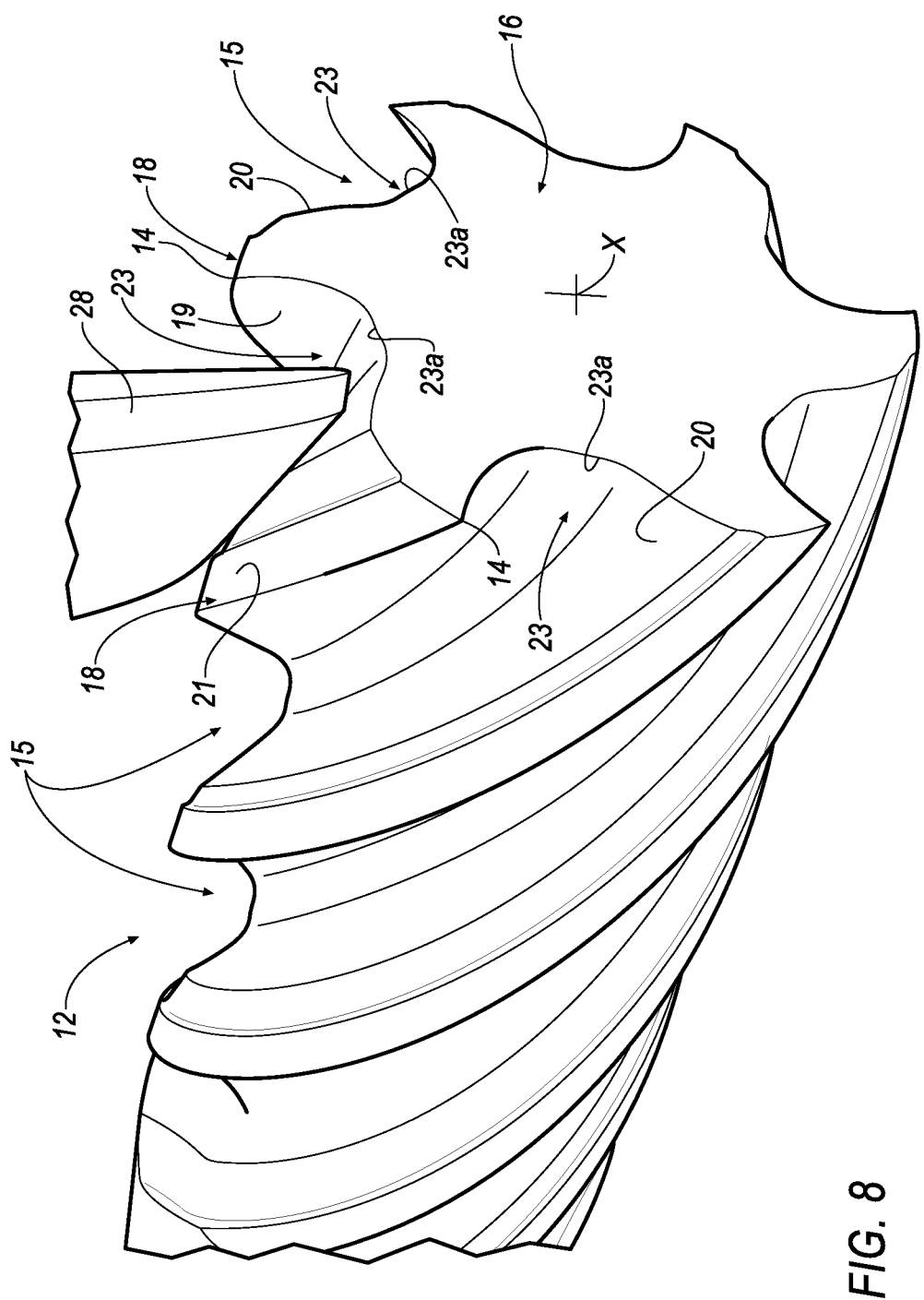
FIG. 8 is an enlarged perspective view showing the single path grinding operation for forming the gully and flute base with a substantially planar or convex portion according to the method of the invention.
Figure 9:
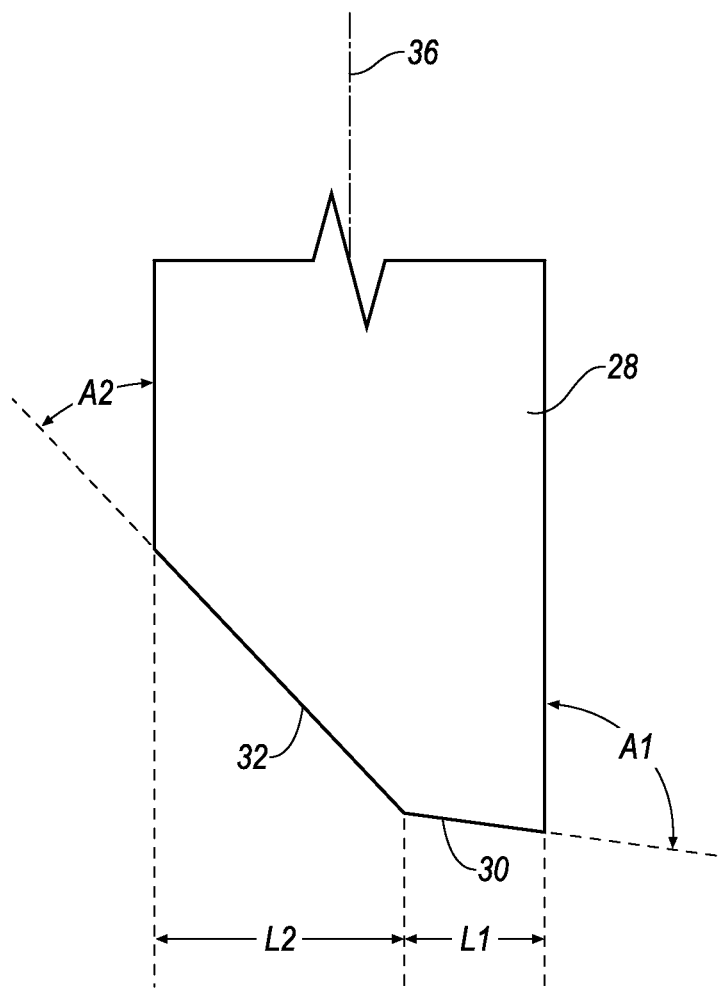
FIG. 9 is an enlarged view showing of the grinding wheel with a first grinding portion formed at a first angle and a second grinding portion formed at a second angle according to an embodiment of the invention.

Referring now to FIGS. 7-9, a method of forming the flute 15 of the milling cutter 10 of the invention will now be described. A flute wheel, shown generally at 26, includes a disc-shaped flute grinding wheel 28. The flute wheel 26 is rotated about a rotational axis 34 that is generally transverse to the axis, X, of the milling cutter 10. As shown in FIG. 8, the grinding wheel 28 has a first grinding portion 30 and a second grinding portion 32. The first grinding portion 30 is substantially planar in profile and has a first length, L1, and the second grinding portion is substantially planar in profile and has a second length, L2. The first length, L1, is smaller than the second length, L2. The first grinding portion 30 is formed at a first angle, A1, with respect to a plane 36 of the grinding wheel 28 that is perpendicular to a rotational axis 34 of the flute wheel 28, and the second grinding portion 32 is formed at a second angle, A2, with respect to the axis 34 of the grinding wheel 28. The angle, A1, is greater than the angle, A2. For example, the angle, A1, may be about 110 degrees, while the angle, A2, is about 45 degrees. It will be appreciated that the invention is not limited by the relative magnitude of the angles A1, A2, and that the invention can be practiced with any desirable angles A1, A2, so long as the angle, A1, is larger in magnitude than the angle, A2.

The flute 15 of the milling cutter 10 of the invention is basically formed using a single path grinding process. In the single pass grinding process, a cylindrical blank is rotated about its own axis, X, while being ground by the circular grinding wheel 28. While the grinding wheel 28 is being driven about the rotational axis 34 of the flute wheel 26 at a relatively high speed of about 3,500 rpm to about 5,000 rpm, the grinding wheel 28 is also moved along a line parallel to the axis, X, of the cylindrical blank at a linear speed of about 1-2 inches per minute. Linear movement of the grinding wheel 15 begin at the leading end 16 of the head 12 and advances to the trailing end 17 of the head 12. Alternatively, the grinding wheel 15 may begin at the trailing end 17 of the head and advances to the leading end 16 of the head 12. Linear motion of the grinding wheel 28 parallel to the longitudinal axis, X, of the cylindrical blank, in combination with rotation of the cylindrical blank about its own longitudinal axis, X, results in a helically disposed spiral groove or flute 15 being formed in the body of a cylindrical blank. The ratio between the angular rotation rate of the cylindrical blank about its axis, X, to the linear speed of the grinding wheel 28 relative to the cylindrical blank, is selected to yield the desired helix angle. Typically, two diametrically opposed helical flutes are cut in the cylindrical wall surface of the cylindrical blank in two separate cutting steps.

As mentioned above, the linear motion of the grinding wheel 28 parallel to the longitudinal axis, X, of the cylindrical blank, in combination with rotation of the cylindrical blank about its own longitudinal axis, X, results in a helically disposed spiral groove or flute 15 being formed in the body of a cylindrical blank. Specifically, the first grinding portion 30 produces the leading face 19 and the substantially planar or convex portion 23a of the flute base 23 of each flute 15, while the second grinding portion 32 produces the rear face 20 of each flute 15 during linear motion of the grinding wheel 28 parallel to the longitudinal axis, X, of the cylindrical blank, in combination with rotation of the cylindrical blank about its own longitudinal axis, X. As a result, the flute 15 with the flute base 23 having the substantially planar or slightly convex portion 23a has a flute volume that is substantially larger than the conventional milling cutter, even though the milling cutter 10 of the invention and the conventional milling cutter have approximately the same core diameter, CD.

Several distinct advantages of the flute 15 of the invention include, but is not limited to:

1) providing more flutes for a given cutting diameter than the conventional cutting tool;

2) providing a flute shape with enough volume for effective chip formation and evacuation while preserving tool strength;

3) providing multi-flute (up to 25 flutes for a cutting diameter of 1 inch) with unequal index to suppress chattering;

4) providing the capability of using relatively larger core diameters, thereby increasing the tool strength;

5) providing the capability of using relatively larger core diameters so as to accommodate internal coolant channels while preserving tool strength;

6) reliable mass production of the tool using a single grinding process; and 7) reducing friction of a swarf (i.e. chips) against flute surfaces.

The patents and publications referred to herein are hereby incorporated by reference.

Having described presently preferred embodiments the invention may be otherwise embodied within the scope of the appended claims.

What is claimed is:

1. A milling cutter, comprising:
a shank;
a cutting head attached to the shank, the cutting head having a plurality of helical teeth, each tooth including a cutting tip, a leading face and a rear face; and
a flute disposed between the leading face of a trailing tooth, and the rear face of an immediately preceding tooth, wherein a gully of the flute has a flute base with a portion that is generally planar in profile to provide additional volume for effective chip evacuation.

2. The milling cutter of claim 1, wherein the gully has a shape resulting from formation in a single path grinding process that employs a grinding wheel with a first grinding portion and a second grinding portion.

3. The milling cutter of claim 2, wherein the gully shape results from:
the first grinding portion being planar and formed at a first angle with respect to a plane that is perpendicular to a longitudinal axis of the milling cutter; and
the second grinding portion being planar and formed at a second angle with respect to the plane, the second angle being different than the first angle.

4. The milling cutter of claim 3, wherein the gully shape results from the first angle being larger than the second angle.

5. The milling cutter of claim 2, wherein the gully shape results from:
the first grinding portion having a first length, and wherein the second grinding portion has a second length, the second length different than the first length.

6. The milling cutter of claim 1, wherein the leading face has a positive or negative radial rake angle.

7. The milling cutter of claim 1, wherein each tooth further comprises a planar primary relief rake facet.

8. The milling cutter of claim 1, wherein the primary relief rake facet has a primary clearance angle of 5-10 degrees.

9. The milling cutter of claim 1, wherein a wedge angle of each tooth is between 60-90 degrees.

10. The milling cutter of claim 1, wherein the teeth are spaced from one another via unequal indexing.

11. The milling cutter of claim 1, wherein:
the milling cutter defines a core diameter and a cutting diameter; and
via the generally planar portion of the flute base, the milling cutter has a larger core diameter than a milling cutter having:
a similar cutting diameter; and
a flute with a gully that is continuously rounded or radiused.

12. The milling cutter of claim 11, comprising:
a plurality of flutes each disposed between a pair of neighboring teeth;
wherein each flute has a gully, each gully comprising a base with a portion that is generally planar in profile to provide additional volume for effective chip evacuation.

13. The milling cutter of claim 11, wherein each tooth further comprises a planar primary relief rake facet.

14. The milling cutter of claim 11, wherein the teeth are spaced from one another via unequal indexing.

\* \* \* \* \*